(No Model.)

H. FOECKE.
SIEVE.

No. 595,537.      Patented Dec. 14, 1897.

WITNESSES:

INVENTOR
H. Foecke
BY
ATTORNEYS.

UNITED STATES PATENT OFFICE.

HENRY FOECKE, OF CROFTON, NEBRASKA.

SIEVE.

SPECIFICATION forming part of Letters Patent No. 595,537, dated December 14, 1897.

Application filed May 25, 1897. Serial No. 638,008. (No model.)

*To all whom it may concern:*

Be it known that I, HENRY FOECKE, of Crofton, in the county of Knox and State of Nebraska, have invented a new and Improved Sieve, of which the following is a full, clear, and exact description.

This invention is a screen adapted particularly for use in connection with threshing-machines; and it has for its purpose to provide a screen capable of the most universal adjustment, whereby a proper relation may be maintained between the caliber of the screen and the amount of grain being handled.

This specification is the disclosure of one form of my invention, while the claim defines the actual scope of the conception.

Reference is to be had to the accompanying drawings, forming a part of this specification, in which similar characters of reference indicate corresponding parts in all the figures.

Figure 1 is a fragmentary plan view of the invention. Fig. 2 is a section on the line II II of Fig. 1. Fig. 3 is a sectional view on the line III III of Fig. 1; and Fig. 4 is a fragmentary section, partly on the line II II of Fig. 1, showing the sieve at an adjustment differing from that shown in Fig. 2.

The frame 5 of the sieve has running longitudinally and centrally through it a bar 6, the ends of which are rabbeted to the lower side of the frame. Bearing upon and running along the bar 6 is a bar 7, similar to the bar 6 and having its ends rabbeted to the top of the frame. Screws pass between the bars 6 and 7 to hold the same together.

The bars 6 and 7 divide the frame into two parts, each of which has a series of metallic plates 8, the upper edges of which are tubulated to loosely embrace bars 9, extending transversely between the bars 6 and 7 and the sides of the frame 5. The bars 9 are arranged parallel with each other in each division of the sieve, while each bar 9 of one division of the series is in alinement with one of the bars 9 of the other division. The lower edge of each plate 8 is also tubulated and clamped around one of a series of bars 10, whereby the bars 10 are rigidly held contradistinguished from revolubly inclosing them as with reference to the bars 9. Each plate 8 has at the middle of its lower portion a recess 11, said recesses 11 respectively receiving clips 12, carried in two longitudinal lines, respectively, on rods 13, which run longitudinally one beneath each division of the frame 5. By swinging the rods 13 the plates 8 will move on the bars 9, so that the plates will occupy various inclinations with reference to the plane in which frame 5 lies. One end of each rod 13 is provided with a longitudinal slot 14, said slots 14 respectively receiving bolts 15, slidable in the slots 14 and also slidable in slots 16, formed in plates 17, rigidly secured to the under side of one end portion of the frame 5 and extending perpendicularly to the frame.

By means of the bolts 15 and the thumb-nuts thereon the parts 13 and 17 may be rigidly clamped in engagement with each other, whereby the rods 13 may be held at any desired degree of proximity to the frame 5 within the extremes of movement of the rods 13. The varying positions of the rods 13 are necessarily followed by varying positions of the plates 8, causing them to give the sieve a large or small caliber. This enables the sieve to be adapted to the varying conditions under which it may be necessary to employ the sieve. It will be seen that the free movement of the bolts 15 within their respective slots 14 and 16 allows the rods 13 to be easily adjusted and also enables the nuts on the bolts to firmly clamp the parts together.

In use the sieve is arranged as shown, and when employed in a thresher the sieve should be adjusted to suit the amount of grain which is to be taken from the straw.

Having thus described my invention, I claim as new and desire to secure by Letters Patent—

A screen having a frame, a plurality of parallel bars held rigidly by the frame, a plate for each bar, the plates having their upper edges tubulated to loosely receive the bars whereby the plates are hung pendent from the bars, a series of additional bars the lower edges of the plates being tubulated respectively to loosely receive the bars, a rod run transversely with reference to the bars, a series of clips attached to the rod and loosely receiving intermediate portions of the last-named bars, and means for holding the rod adjusted with reference to the frame.

HENRY FOECKE.

Witnesses:
ALBERT HOEBELHEINRICH,
H. J. MILLER.